(No Model.)
J. LYNCH.
ELECTRIC WIRE CONDUIT.
No. 371,202. Patented Oct. 11, 1887.
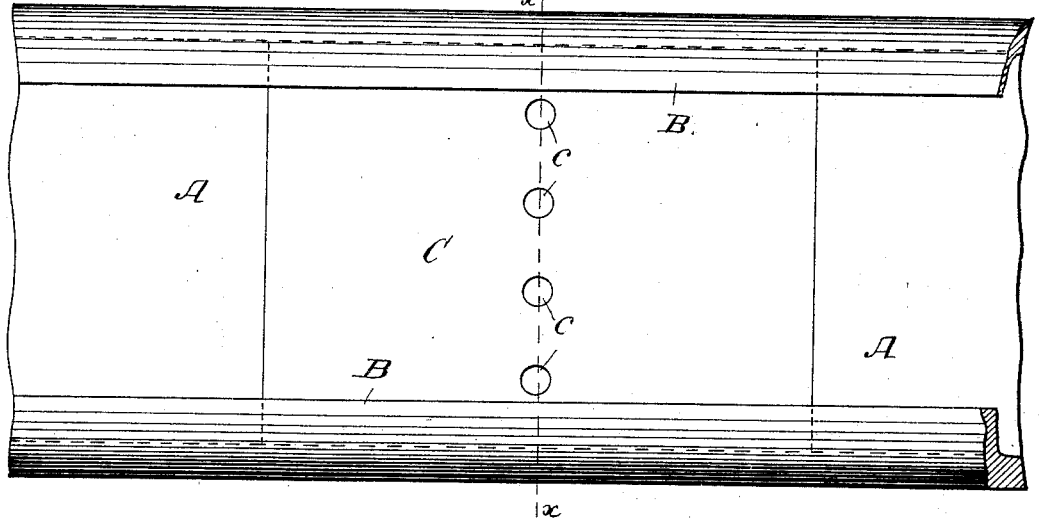
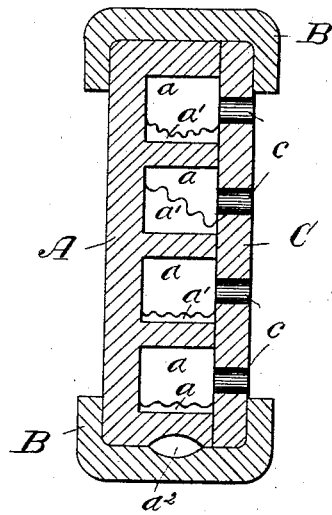
Witnesses:
C. T. Bell,
O. A. Clark
Inventor
John Lynch
By Paine & Ladd
Attys.

UNITED STATES PATENT OFFICE.

JOHN LYNCH, OF WASHINGTON, DISTRICT OF COLUMBIA.

ELECTRIC-WIRE CONDUIT.

SPECIFICATION forming part of Letters Patent No. 371,202, dated October 11, 1887.

Application filed March 2, 1886. Renewed July 26, 1887. Serial No. 245,364. (No model.)

*To all whom it may concern:*

Be it known that I, JOHN LYNCH, a citizen of the United States, residing at Washington, in the District of Columbia, have invented certain new and useful Improvements in Electric-Wire Conduits; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to conduits for wires used for sending messages by means of electricity; and it consists in the detailed construction and combination of the parts, hereinafter fully described and claimed.

The conduit as constructed, according to the present invention, is formed of terra-cotta or other similar material which is brought to the required shape by being forced through suitable dies. The pipe-shaped portions thus formed are then divided longitudinally and fired or baked, according to the usual manner of making articles in terra-cotta. Other pipe-shaped portions are also formed in a similar manner and divided longitudinally. These are used to unite the halves of the conduit together in such manner as to keep them in place when laid underground, and at the same time allow of their being taken apart with ease whenever it is required to pass an additional wire through the conduit, or to make a branch connection with any of the wires contained in it.

I will now proceed to describe my invention with reference to the accompanying drawings, in which—

Figure 1 is a side elevation of a portion of the conduit. Fig. 2 is a cross section through the same, taken on the line *x x* in Fig. 1.

Similar letters of reference indicate corresponding parts in both figures.

A represents the main conduit formed in suitable lengths for convenience in handling and containing passages *a* within it, through which the electric wires pass. Each passage *a* may be provided with rests *a'* at various points, so that the various wires passing through one passage may be kept from contact with each other. A separate passage, $a^2$, may be formed in the lower part of the conduit for carrying off subsoil drainage-water; or the lower one of the passages *a* may be used for that purpose.

Each section of the main conduit A is formed of terra-cotta, or other similar material, by being passed through suitable dies. The sections are then separated longitudinally into two parts. The line of division may pass vertically through the center of the passages *a*, or, preferably, to one side of them, as shown in Fig. 2, to avoid disturbing the wires when the conduit is opened for any purpose.

B are trough-shaped pieces for joining the halves of the conduit together. These are made in suitable lengths in the same manner as the main conduit, and are subsequently divided into two portions. These may be made deep enough to meet at the center line of the pipe and form double walls to the conduit. Wherever branches are led off from the wires a block, *c*, is inserted to form a portion of one side of the conduit, and is provided with side passages or holes, *c*, through which branch wires may pass and connect with the main wires in the passages *a*.

Having thus described my invention, what I claim as new, and desire to secure by Letters Patent, is—

1. In a conduit for electric wires, the combination of a section made of two vertically-separable portions with the trough-shaped cap and base-pieces for uniting the same together, substantially as and for the purpose set forth.

2. In a conduit for electric wires, the combination of a section made of two vertically-separable portions, and provided with holes in one side thereof at right angles to the conduit-passages, with the trough-shaped cap and base-pieces for uniting the same together, substantially as and for the purpose set forth.

3. In a conduit for electric wires, the combination of a series of blocks, A, a block, C, provided with holes *c*, substantially at right angles to the conduit-passages, and the trough-shaped pieces B, placed continuously over the top and bottom portions of the conduit for uniting the separable portions of blocks A and C together, substantially as described and shown.

4. In a conduit for electric wires, the combination of a series of blocks, A, each made of two portions separable vertically to one side of the passages for the wires, a block, C, formed of two similar vertically-separable portions interposed between two of the main blocks A, and provided with holes $c$, substantially at right angles to the conduit-passages, and the trough-shaped pieces B, placed continuously over the top and bottom portions of the said blocks A and C, for uniting their separable portions, substantially as set forth.

In testimony whereof I affix my signature in presence of two witnesses.

JOHN LYNCH.

Witnesses:
PATTERSON SPRIGG,
D. DAVIDSON.